W. A. GREENLAW.
COUPLING FOR TRAIN PIPES.
APPLICATION FILED MAY 5, 1911.

1,039,731.

Patented Oct. 1, 1912.

2 SHEETS—SHEET 1.

Witnesses:
N. C. Lombard
Mary C. Smith

Inventor:
Warren A. Greenlaw,
by Walter E. Lombard,
Atty.

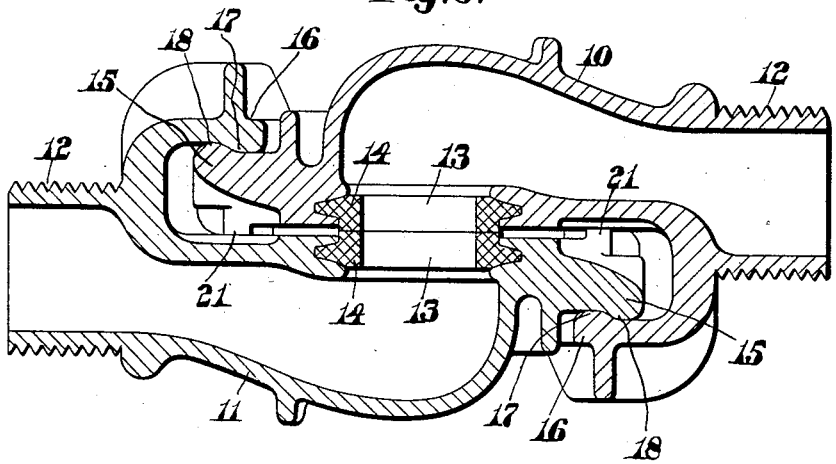

UNITED STATES PATENT OFFICE.

WARREN A. GREENLAW, OF MELROSE HIGHLANDS, MASSACHUSETTS, ASSIGNOR TO THE GREENLAW MANUFACTURING COMPANY, OF BOSTON, MASSACHUSETTS, A CORPORATION OF MAINE.

COUPLING FOR TRAIN-PIPES.

1,039,731.      Specification of Letters Patent.      Patented Oct. 1, 1912.

Application filed May 5, 1911. Serial No. 625,337.

*To all whom it may concern:*

Be it known that I, WARREN A. GREENLAW, a citizen of the United States of America, and a resident of Melrose Highlands, in the county of Middlesex and State of Massachusetts, have invented certain new and useful Improvements in Couplers for Train-Pipes, of which the following is a specification.

This invention relates to pipe couplings but more particularly to such as are used to connect the ends of train pipes and the like, and has for its object the production of a coupling which may be readily coupled and uncoupled, but which will remain firmly locked when in use.

A further object of the invention is to provide a means for preventing the rocking of the coupling members relative to each other and the consequent leakage that would occur thereby.

The invention consists in certain novel features of construction and arrangement of parts which will be readily understood by reference to the description of the drawings and to the claims hereinafter given.

Figure 1:
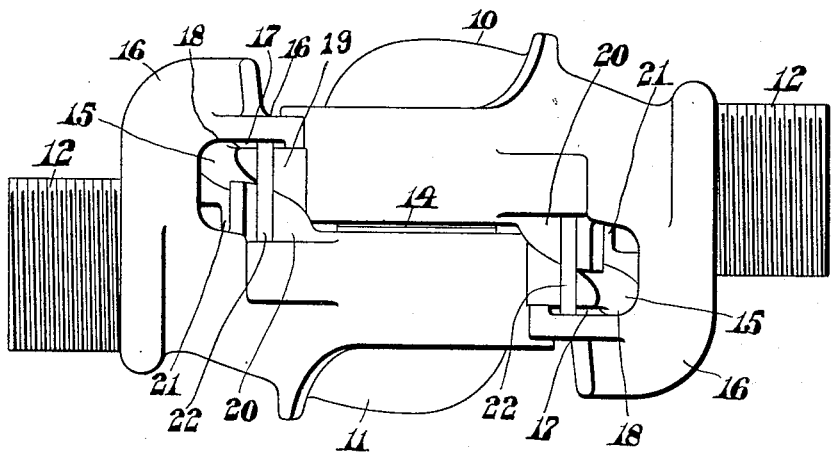
Figure 2:
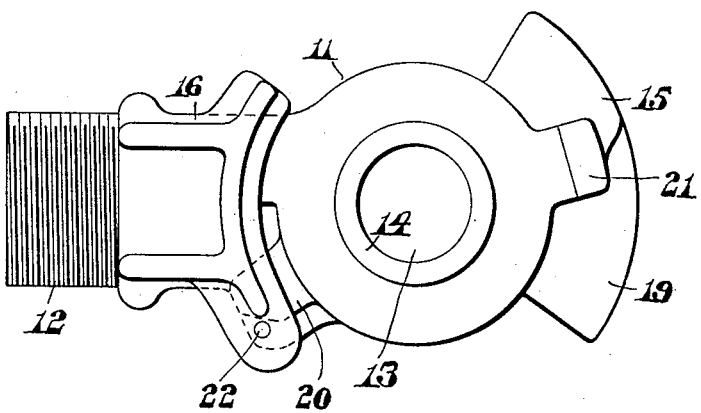

Of the drawings: Figure 1 represents an inverted plan view of two coupling members coupled together and embodying the features of the present invention. Fig. 2 represents a side elevation of one of said coupling members. Fig. 3 represents a horizontal section of the two coupling members coupled together, looking upwardly. Fig. 4 represents an end elevation of coupling member shown in Fig. 2.

Similar characters designate like parts throughout the several figures of the drawings.

In the drawings, 10 and 11 represent two coupling members each having at one end a threaded tubular portion 12 by which the coupling member may be attached to any suitable train pipe in the ordinary manner. Each of these coupling members is provided with a lateral port 13 in which is seated a resilient gasket 14, a portion of which projects beyond the side wall surrounding the port 13 of each coupling member 10 and 11.

Each member 10 and 11 is provided with a lipped toe flange 15 preferably concentric with the port 13. Near the threaded tubular portion 12 of each coupling member is another projecting flange 16 formed upon each member which will be referred to hereinafter as the heel flange 16. Each of the flanges 16 is provided with an inwardly extending lip 17 which engages with the projecting rib or lip 18 of each of the flanges 15. A portion of the toe flange 15 is preferably chamfered off to form an inclined surface 19 as is best shown in Fig. 4. On each of the members 10 and 11 is a lug or projection 20 which is adapted to contact with the inclined surface 19 of the toe flange 15 to bind the interlocking flanges together. On each of these members 10 and 11 is also preferably constructed a lug or projection 21 on the opposite side of the center line of each member from the projection 20 on that member which lug or projection 21 is adapted to contact with the opposing face of the other member to prevent the two members from rocking. The lugs or projections 20—21, coacting with opposed faces on the other coupling members and disposed on opposite sides of the center of coupling members retain said members parallel and prevent any rocking movement relative to each other. Pins 22 are provided to limit the movement of the coupling members 10 and 11 in the usual manner. When these members 10 and 11 are coupled together as is shown in Figs. 1 and 3, the projecting resilient gaskets 14 contact and are in alinement with one another and are so held by the interlocking toe and heel flanges which are preferably concentric therewith.

The faces of the projections 20 which contact with the inclined faces 19 of the toe flanges 15 are also preferably chamfered or inclined. The contacting of these projections with the inclined surfaces compensates for wear so that the interlocking flanges do not work loose as has frequently been the case with the couplings heretofore constructed.

Each of the lips 18 is chamfered off as indicated at 23 in Fig. 4, the purpose of this construction being to permit the uncoupling of the coupling members with a shorter movement about the openings 13.

It is quite evident that where the coupling members are utilized to connect pipes conveying air or steam it is quite desirable that there should be absolutely no leakage and this result is accomplished by the construction of the coupling member in the manner shown and described herein. By positioning the lugs or projections 20—21 radially to the center of the openings 13 and on opposite sides thereof, the gaskets are always retained in parallelism and in firm contact with each other, so that there is no chance for breaking down the projecting edges of said gaskets, thus obviating any possibility of leakage on this account, and as all rocking movement of the coupling members is prevented, the projecting end faces of the gaskets are always retained in firm contact obviating the leakage that might result even when the gaskets were new if one coupling member was permitted to tilt relative to the other.

It is believed that the operation and many advantages of the invention will be fully understood from the foregoing.

The applicant is aware that a considerable number of changes in the construction and arrangement of parts could be made by anyone skilled in the art without departing from the scope of his invention, and he does not care to be limited to the particular embodiment herein shown and described.

Having thus described my invention, I claim:—

1. In a device of the class described, two opposing members provided with lateral ports and interlocking flanges; an inclined portion on the face of each of said members adapted to co-act with a projection on the opposing face of the other member; and a second projection on the face of each member on the opposite side of the center line of the member from the first projection adapted to co-act with the opposing face of the other member to prevent rocking of one member on the other.

2. In a device of the class described, two pipe members having lateral ports provided with projecting resilient gaskets adapted to register with each other; a heel flange adapted to lock with a corresponding toe flange on the other member, the toe flange of each of said members having a portion of its inner face inclined to co-act with a projection on the opposing face of the other member; and a projection on each of said members adapted to contact with the other member and so disposed as to prevent rocking of one member on the other.

3. In a device of the class described, two pipe members having lateral ports provided with projecting resilient gaskets adapted to register with each other; a heel flange adapted to lock with a corresponding toe flange on the other member, the toe flange of each of said members having a portion of its inner face chamfered to co-act with a projection on the opposing face of the other member; and a second projection on each of said members on the opposite side of the center line of the member from the first projection to co-act with the opposing face of the other member to prevent rocking of one member on the other.

4. In a device of the class described, two opposing members provided with lateral ports and interlocking flanges; an inclined portion on the face of one of said members adapted to coact with a projection on the opposing face of the other member; and a second projection on the face of one member on the opposite side of the center line of the member from the first projection adapted to coact with the opposing face of the other member to prevent rocking of one member on the other.

Signed by me at 4 Post Office Sq., Boston, Mass., this 2nd day of May, 1911.

WARREN A. GREENLAW.

Witnesses:
WALTER E. LOMBARD,
NATHAN C. LOMBARD.